United States Patent
Bigbee et al.

(10) Patent No.: US 12,205,128 B2
(45) Date of Patent: *Jan. 21, 2025

(54) DEVICE IDENTIFICATION SYSTEMS AND METHODS

(71) Applicant: Comscore, Inc., Reston, VA (US)

(72) Inventors: Yvonne L. Bigbee, Nokesville, VA (US); Randall L. McCaskill, Herndon, VA (US)

(73) Assignee: Comscore, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,531

(22) Filed: Jun. 3, 2022

(65) Prior Publication Data
US 2023/0021524 A1 Jan. 26, 2023

Related U.S. Application Data

(60) Continuation of application No. 17/341,168, filed on Jun. 7, 2021, now Pat. No. 11,367,087, which is a continuation of application No. 16/946,238, filed on Jun. 11, 2020, now Pat. No. 11,030,632, which is a (Continued)

(51) Int. Cl.
| | |
|---|---|
| G06Q 30/0201 | (2023.01) |
| G06F 16/903 | (2019.01) |
| G06F 16/9535 | (2019.01) |
| H04L 12/28 | (2006.01) |
| H04L 41/046 | (2022.01) |
| H04L 41/0853 | (2022.01) |
| H04L 41/142 | (2022.01) |
| H04L 43/04 | (2022.01) |
| H04L 43/062 | (2022.01) |
| H04L 43/0811 | (2022.01) |

(Continued)

(52) U.S. Cl.
CPC ... *G06Q 30/0201* (2013.01); *G06F 16/90335* (2019.01); *G06F 16/9535* (2019.01); *H04L 41/046* (2013.01); *H04L 41/0853* (2013.01); *H04L 41/142* (2013.01); *H04L 43/04* (2013.01); *H04L 43/062* (2013.01); *H04L 43/0811* (2013.01); *H04L 61/5014* (2022.05); *H04L 12/28* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 5,968,126 A | * | 10/1999 | Ekstrom | H04L 12/185 709/225 |
| 7,480,723 B2 | * | 1/2009 | Grabelsky | H04L 65/1101 709/227 |
| 8,095,640 B2 | | 1/2012 | Guingo | |

(Continued)

*Primary Examiner* — Backhean Tiv
(74) *Attorney, Agent, or Firm* — Blank Rome LLP

(57) ABSTRACT

Systems and methods herein log traffic to and from a device on a network. Logging can occur using a metering device, router, proxy, or other elements. For example, a metering device operatively coupled to a routing device can log the traffic directed to and originating from a user device. Logged traffic can be analyzed to identify users, devices, and/or sessions. For example, an identifier unique to the user device in the session, a device type of the user device, and a specific user of the device during the session can be identified.

27 Claims, 8 Drawing Sheets

Related U.S. Application Data division of application No. 15/963,071, filed on Apr. 25, 2018, now Pat. No. 10,776,798.

(60) Provisional application No. 62/489,599, filed on Apr. 25, 2017.

(51) Int. Cl.
*H04L 61/5014* (2022.01)
*H04L 67/00* (2022.01)

(56) References Cited

U.S. PATENT DOCUMENTS

| | | | | | |
|---|---|---|---|---|---|
| 8,635,321 | B2* | 1/2014 | Schieder | | H04L 67/04 709/217 |
| 8,751,461 | B2* | 6/2014 | Abraham | | G06Q 10/0637 707/706 |
| 8,902,769 | B1* | 12/2014 | Dehghan | | H04L 43/08 709/224 |
| 8,959,650 | B1* | 2/2015 | Richards | | G06F 21/335 713/153 |
| 9,027,000 | B2* | 5/2015 | Guerrera | | G06F 11/3419 717/130 |
| 9,692,725 | B2* | 6/2017 | Venkatraman | | H03M 7/30 |
| 9,806,940 | B1* | 10/2017 | Nielsen | | H04L 12/4641 |
| 10,116,535 | B1* | 10/2018 | Brown | | H04L 43/062 |
| 10,142,382 | B1* | 11/2018 | Arini | | H04L 65/1076 |
| 10,181,988 | B1* | 1/2019 | Farah | | H04L 43/0876 |
| 10,367,689 | B2* | 7/2019 | Brown | | H04L 43/0876 |
| 10,776,798 | B2* | 9/2020 | Bigbee | | H04L 43/062 |
| 11,030,632 | B2* | 6/2021 | Bigbee | | G06F 16/90335 |
| 11,265,368 | B2* | 3/2022 | Luo | | H04L 45/745 |
| 11,367,087 | B2* | 6/2022 | Bigbee | | H04L 43/04 |
| 2001/0021176 | A1* | 9/2001 | Mimura | | H04L 43/065 370/235 |
| 2001/0034759 | A1* | 10/2001 | Chiles | | H04L 61/5038 709/238 |
| 2003/0191853 | A1* | 10/2003 | Ono | | H04L 47/22 709/232 |
| 2003/0214913 | A1 | 11/2003 | Kan | | |
| 2004/0049714 | A1* | 3/2004 | Marples | | H04L 12/2827 714/43 |
| 2004/0184404 | A1* | 9/2004 | Carpenter | | H04L 43/00 370/235 |
| 2005/0047342 | A1 | 3/2005 | Babiarz | | |
| 2005/0050045 | A1* | 3/2005 | Taira | | G06F 16/951 707/999.009 |
| 2005/0097206 | A1 | 5/2005 | Rabinovitch | | |
| 2005/0129017 | A1 | 6/2005 | Guingo | | |
| 2005/0144314 | A1 | 6/2005 | Kan | | |
| 2007/0192593 | A1* | 8/2007 | Boisjolie | | H04L 63/20 713/162 |
| 2007/0217430 | A1* | 9/2007 | Baird | | H04L 65/1104 370/395.52 |
| 2009/0138619 | A1* | 5/2009 | Schnizlein | | H04L 63/0892 709/245 |
| 2009/0177768 | A1* | 7/2009 | Kind | | G06F 16/954 709/224 |
| 2010/0122091 | A1* | 5/2010 | Huang | | H04L 9/3226 713/171 |
| 2011/0125913 | A1* | 5/2011 | Maes | | H04L 65/1046 709/228 |
| 2012/0324567 | A1* | 12/2012 | Couto | | H04L 41/0853 709/224 |
| 2014/0122690 | A1* | 5/2014 | Rowe | | H04L 67/535 709/224 |
| 2014/0122715 | A1* | 5/2014 | Rowe | | H04L 67/02 709/225 |
| 2014/0123252 | A1* | 5/2014 | Rowe | | H04L 63/102 726/6 |
| 2014/0149562 | A1* | 5/2014 | Xiao | | H04L 67/535 709/222 |
| 2014/0359109 | A1* | 12/2014 | Arlitt | | H04L 41/069 709/224 |
| 2015/0341379 | A1* | 11/2015 | Lefebvre | | H04L 43/0894 726/22 |
| 2016/0036942 | A1* | 2/2016 | Silva Filho | | H04L 67/51 709/203 |
| 2016/0065476 | A1* | 3/2016 | Reddy | | H04L 43/0894 709/224 |
| 2016/0119182 | A1* | 4/2016 | Brown | | H04W 88/16 370/252 |
| 2016/0156673 | A1* | 6/2016 | Emmanuel | | H04W 4/38 370/338 |
| 2016/0191641 | A1* | 6/2016 | Rowe | | H04L 63/102 709/225 |
| 2018/0034726 | A1* | 2/2018 | Kim | | H04L 45/24 |
| 2018/0308111 | A1* | 10/2018 | Bigbee | | H04L 61/5014 |
| 2019/0104128 | A1 | 4/2019 | Carol | | |
| 2020/0195535 | A1* | 6/2020 | Smith | | H04N 21/4394 |
| 2020/0259791 | A1* | 8/2020 | Mundilla Garcia | | H04L 63/10 |
| 2020/0302454 | A1* | 9/2020 | Bigbee | | H04L 41/142 |
| 2021/0168445 | A1* | 6/2021 | Smith | | H04N 21/8358 |
| 2022/0038309 | A1* | 2/2022 | Boutros | | H04L 45/02 |
| 2022/0101346 | A1* | 3/2022 | Bigbee | | H04L 41/0853 |

* cited by examiner

DEVICE IDENTIFICATION SYSTEMS AND METHODS

CROSS-REFERENCE TO RELATED APPLICATION

This application is a continuation of U.S. patent application Ser. No. 17/341,168, filed Jun. 7, 2021, and published as U.S. Patent App. Pub. No. 2022/0302454 on Mar. 31, 2022, which is a continuation of U.S. patent application Ser. No. 16/946,238, filed Jun. 11, 2020, and issued as U.S. Pat. No. 11,030,632 on Jun. 8, 2021, which is a divisional of U.S. patent application Ser. No. 15/963,071, filed Apr. 25, 2018, and issued as U.S. Pat. No. 10,776,798 on Sep. 15, 2020, which claims the benefit of and priority to U.S. Provisional Patent Application No. 62/489,599, filed Apr. 25, 2017, the entireties of which are incorporated herein by reference.

FIELD OF THE DISCLOSURE

The present disclosure relates generally to electronic communication devices and methods, and more particularly to systems and methods for monitoring and identifying traffic over a network.

BACKGROUND OF THE DISCLOSURE

Knowing the actual identity and behavior of a computer or an electronic device user can be invaluable for many reasons. However, identification and comprehensive data collection reflecting behavior can be difficult to achieve.

As to identity, when a user accesses the Internet, for example, identification information relating to the device from which such access is carried out or the software may be available over the network, and user input information, such as a login name or other keywords, might be available at times. However, this information may not identify the actual user and user identification does not always accompany requests during a network session, for example, for webpages, and the like. Even when user identification information is provided in a communication, such as when using instant messaging software, this information may be generally limited to a user's e-mail address or a user name, rather than an actual name or user's identity. Sometimes a user-defined profile may be available as well. However, this limited information does not often provide enough useful information about the user, particularly when the user may have multiple accounts each with their own distinct user-defined profile, for instance. It is particularly disadvantageous when trying to derive user demographic information for market research or other purposes.

The information collected relating to one or more of those profiles is also presents challenges for completeness and consistency. Different sectors may need different granularity of information to accurately determine behavior of a user during one or more network session. Such behavior may not be limited to consumer behavior but may instead be useful in other areas such as cyber-security, advertising (online and other types), network service quality parameters, counter-intelligence, and the like. User behavior may indicate how products or services are being received by the consumer, and market research may be conducted to attempt to quantify attributes or characteristics of a particular consumer segment. The data extracted can inform companies about how their and others' products or services are perceived and bought by purchasers or potential purchasers in the marketplace, and how the companies' products or services can be changed to achieve the companies' business goals.

Traditionally, this information is segregated into demographic categories, such as age, gender, marital status, income bracket, education level, et cetera. A problem common to general protocols for performing consumer-oriented market research is collating consumers' activities and spending habits to the consumers' demographic profiles. Surveys, whether in person, by mail or the Internet, usually include inquiries about a person's relevant demographic information when inquiring about the person's buying habits and/or the market research information. However, for Internet-activity monitoring, the process of asking the user to provide this information is cumbersome and error prone.

Internet-activity monitoring includes a server-side consumer data collection strategy in which an individual Internet content provider ("website") monitors and collects data about each consumer who has requested or attempted to request data from ("visited") the website, and then compiles this data about all the consumers who have visited that website.

Alternatively, or additionally, data collection directly from an Internet consumer's device or computer has also been proposed, e.g., client-side data collection. Such systems commonly involve installing a software application onto the consumer's computer, which operates at the same time as Internet browser application software. The software then collects data about the consumer's Internet usage, e.g., which websites the consumer has visited. The data is then uploaded to a data-collecting computer on the Internet. Such approaches possess a variety of limitations. One example is their limited ability or inability to monitor Internet-Of-Things devices, which may not connect and communicate in the manner of user devices bearing web browsers or applications which communicate on common paths and higher network layers. Further, existing products are tied to specific devices and/or operating systems. Many are even application-specific, limited to observing specific user web browsers or similar applications.

A strategy that seeks to capture more comprehensive data regarding network traffic involves use of an intermediary domain, which serves as a pass-through for traffic into and out of the network. The intermediary domain is implemented using servers which monitor a user's activities by tracking and filtering the requests and replies between the user and content providing servers and proxy servers, as detailed in U.S. Pat. No. 8,751,461, filed Apr. 1, 2011, herein incorporated by reference in its entirety. However, even if traffic outbound from and inbound to the local network is observed at an intermediary domain, limitations still exist, and network-internal traffic may remain undetectable.

Regardless of traffic monitoring technique (e.g., server-side, client side, and intermediary domain), a challenge for each of these techniques remains collection and relation of data about the consumer (such as age, income level, marital status, and other demographic, economic, and personal information to the user's activities) which would allow the data to be compared with consumer databases from other sources without noticeably affecting the user's experience. More, server-side, client side and intermediary domain systems still miss many other types of data passing through a network during and after a network session.

Accordingly, there is a need to more comprehensively capture data in a network as well as a need to accurately identify a particular device on a particular network session with a particular user of the particular device.

SUMMARY OF THE DISCLOSURE

The foregoing needs are met, to a great extent, by the present disclosure. In this respect, before explaining at least one embodiment of the present disclosure in detail, it is to be understood that the present disclosure is not limited in its application to the details of construction and to the arrangements of the components set forth in the following description or illustrated in the drawings. The present disclosure is capable of embodiments in addition to those described and of being practiced and carried out in various ways. Also, it is to be understood that the phraseology and terminology employed herein, as well as the abstract, are for the purpose of description and should not be regarded as limiting.

In an embodiment, a method for collecting traffic data from devices on a network comprises receiving, at a metering device operatively coupled to a routing device and from a user device, a configuration protocol discovery message. The network access to the user device is then assigned using the metering device. Next, the metering device receives a request for content, wherein the routing device provides connectivity to an external network, and wherein the user device connects to the metering device over a local network. The traffic to and from the user device is logged in a traffic log, wherein the logging creates an entry including an origin of the traffic and a destination of the traffic. The request for content is transmitted from the metering device and to the routing device for communication to the external network. The content is transmitted from the metering device and to the user device after being received by the metering device from the routing device after communication via the external network. Finally, the traffic log is transmitted from the metering device and to a third-party server, the traffic.

In another embodiment, a method for collecting comprehensive traffic data from devices on a network comprises receiving, at a metering device operatively coupled to a routing device providing connectivity to an external network, traffic directed to and originating from a user device, wherein the user device connects to the metering device, and wherein the traffic is associated with a session. The method further comprises logging, using the metering device, the traffic to and from the user device, wherein logging creates an entry associated with the session including an origin and a destination to an entry associated with the session; transmitting, using the metering device, the traffic to or from the user device to the routing device for communication over the network; and extracting, from the traffic, an identifier unique to the user device in the session. The method still further comprises identifying a device type of the user device based on the identifier; identifying a specific user of the device during the session based upon the identifier and identification rules; and associating the specific user with the session and the entry.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
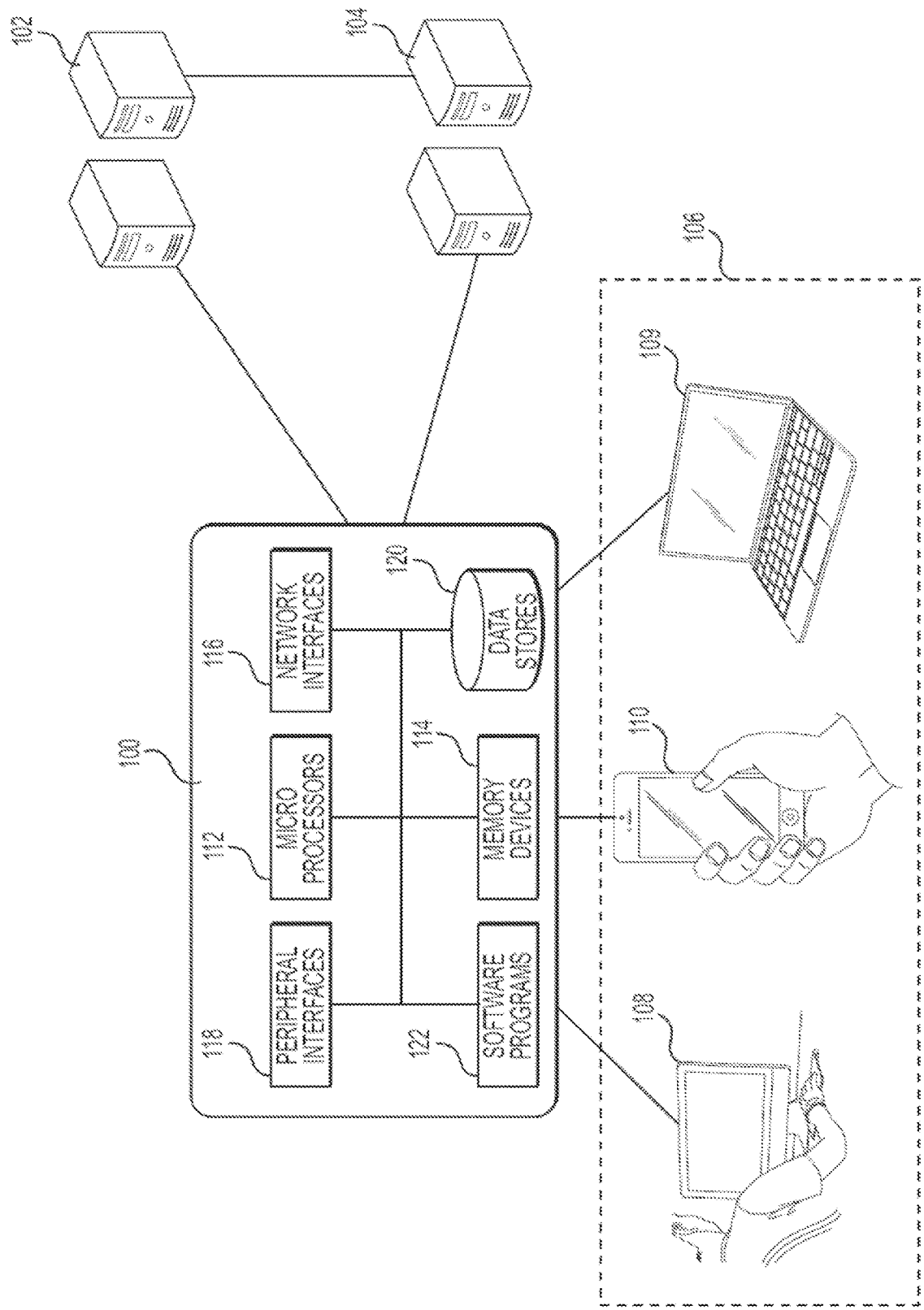
FIG. 1A illustrates an example hardware and network configurations for a content provider, a creative provider, an analysis network, and client devices.

FIG. 1A illustrates example hardware and network configurations for various devices that may be used to perform one or more operations of the described aspects. As shown, a content provider 100, a creative provider 102, and an analysis network 104 are in communication with one another.

The content provider 100 may be a website owner or content publisher in communication with a plurality of client devices 106. The client devices 106 may include a personal computing device, such as a desktop 108, a laptop computer 109, a mobile device 110, such as a smartphone or tablet, a kiosk terminal, a Global Positioning System (GPS) device, and/or other devices. The client devices 106 may be loaded with an operating system and a web browser configured to render webpages or other web or application content from the content provider 100. Example operating systems include Microsoft Windows, Apple OS X, Linux, iOS, and Android, and example web browsers include Internet Explorer, Google Chrome, Mozilla Firefox, and Safari. Accordingly, the client device 106 may receive client-side code to render a webpage from one or more external devices, such as a web server involved with serving webpages, advertisements, creative, or other information to the client device 106. For example, the client device may access HyperText Markup Language (HTML) code from the content provider 100 that provides instructions to render a desired webpage.

The HTML code may also be embedded with JavaScript that may dynamically access a creative (e.g., advertisement content) from the content provider 100 and/or the creative provider 102. The JavaScript may load other content (e.g., advertisements) to the client device 106 without leaving a webpage, animate content (e.g., fade them in and out), and/or create interactive content. For example, the JavaScript may include a link directed to the creative provider 102 which instructs the desired size and location of the content.

The creative provider 102 may be a company seeking to market or sell products or services, or an advertisement agency or broker that may direct creatives (e.g., advertisement content) to the content provider 100. The creative provider 102 may publish advertisement content to client devices 106 based on cookies detailing a user's web behavior. For example, the creative provider 102 may include servers from Google AdSense that facilitates targeted publication of advertisement content to users. In some embodiments, the advertisement content may be generated by JavaScript linked and/or embedded in a predetermined location of the webpage. The advertisement content may be in the form of, for example, web banners, pop-up ads, floating ads, expanding ads, and/or trick ads.

The analysis network 104 may include third-party servers seeking to receive information related to the creatives viewed on the client device 106. The analysis network 104 may be configured to receive results of and/or initiate one or more analyses of data received from or about the client device 106. The analysis network 104 may also be configured to detect the presence of objects from the creative provider 102 and detect a response of the client device 106. For example, the analysis network 104 may determine a result from the JavaScript sent from the content provider 100 and/or creative provider 102.

Although only the hardware configurations for the components are shown in FIG. 1A, each of the content provider 100, the creative provider 102, the analysis network 104, and the client devices 106, may include microprocessors 112 of varying core configurations and clock frequencies. These entities may also include one or more memory devices or computer-readable media 114 of varying physical dimensions and storage capacities, such as flash drives, hard drives, random access memory, et cetera, for storing data, such as images, files, and program instructions for execution by one or more microprocessors 112. These entities may include one or more network interfaces 116, such as Ethernet adapters, wireless transceivers, or serial network components for communicating over wired or wireless media using protocols, such as Ethernet, wireless Ethernet, code divisional multiple access (CDMA), time division multiple access (TDMA), etc. These communication protocols may be used to communicate between the content provider 100, the creative provider 102, the analysis network 104, and the client devices 106. These entities may also have one or more peripheral interfaces 118, such as keyboards, mice, touchpads, computer screens, touchscreens, etc. for enabling human interaction with and manipulation of devices of the content provider 100, the creative provider 102, the analysis network 104, and the client devices 106.

The content provider 100, the creative provider 102, the analysis network 104, and the client devices 106 may each have the computer-readable media 114 physically or logically arranged or configured to provide for or store one or more data stores 120, such as one or more file systems or databases, and one or more software programs 122, which may contain interpretable or executable instructions for performing one or more of the disclosed aspects. The components may comprise any type of hardware, including any necessary firmware or software for performing the disclosed aspects. The components may also be implemented in part or in whole by electronic circuit components or processors, such as application-specific integrated circuits (ASIC) or field-programmable gate arrays (FPGAs).

While described in terms of website owners or content publishers, the content provider 100, the creative provider 102, the analysis network 104, and/or other elements can be involved in a variety of network communication. For example, Internet of Things (IoT) service providers or communication, business or industrial transmissions from devices or controllers, network infrastructure functionality, et cetera, can also be included in traffic between elements associated with a local network and communicating over linked networks without departing from the scope or spirit of the innovation.

Figure 1B:
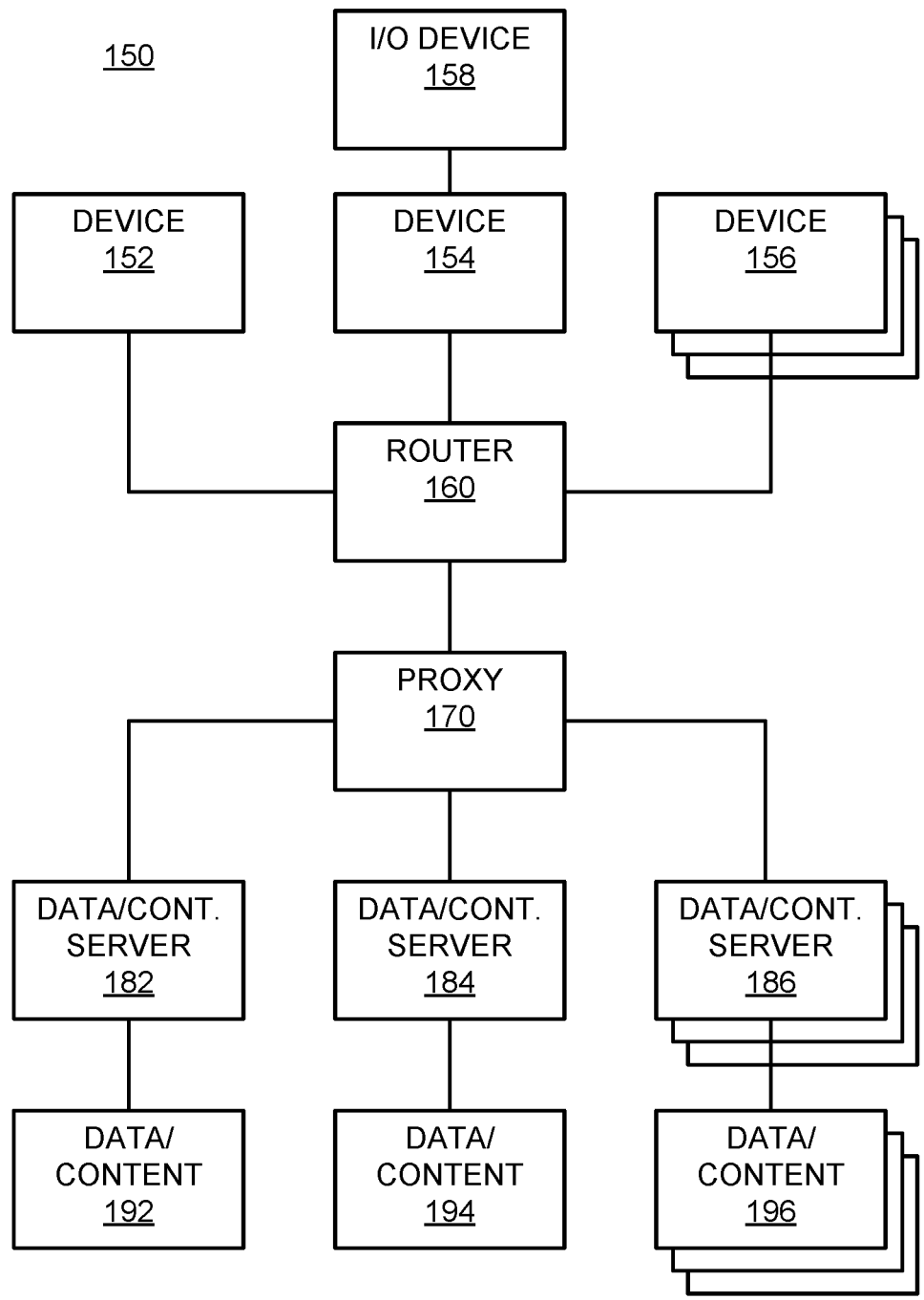
FIG. 1B illustrates an example traffic monitoring and/or device identification system.

Aspects disclose herein relate to systems and methods useful for collecting data indicative or representative of a specific user's activity and identity over a network session, as well as monitoring and metering traffic comprehensively on a network. In accordance with an aspect of this disclosure, a device identification system 150 is illustrated in FIG. 1B.

A router 160 is established as a routing device for connection between one or more electronic devices 152, 154, 156. Electronic devices 152, 154, 156 may communicate with proxy servers and data servers via the router 160 to which all of each user of the electronic devices' 152, 154, 156 activity is routed. The electronic devices 152, 154, 156 are connected to the router 160 over a communication channel 16 (wired, wireless, or both). For example the electronic devices 152, 154, 156 may be connected by an Ethernet cable to the router 160 and/or via WiFi. The router 160 enables all of the activity to be filtered and data to be collected about specific types of activity of specific users, and store such activity locally and/or on external servers (not shown). The router 160 may be part of a home network or a private network (e.g., a corporate office network). The router 160 is provided in addition to, or is present instead of, a proxy server 170 (e.g., an Internet Service Provider machine).

In an example use case scenario, an intermediary domain is established on the Internet where sessions are maintained by passing data to and from the electronic devices 152, 154, 156, data/content servers 182, 184, 186 with content/data 192, 194, and 196 via the router 160. For example, by simply instructing the user's Internet browser to route all Internet traffic from the user through the router 160, the intermediary domain connected to the router 160 can provide data for collection as desired without incurring perceptible delays in web page retrieval and the like.

Enrollment in the device identification system 150 by the electronic devices 152, 154, 156 may be voluntary on the part of the individual user, and the enrolled user may be provided some incentive in return for allowing the system 150 to have all of that user's Internet traffic routed through the system's domain. Alternatively, enrollment in the system 150 of specific users and of the electronic devices 152, 154, 156 may be mandatory. For example, specific information about the user could be gathered as a prerequisite for enrollment, which enriches the data collected about that user's network usage habits and permits inter-database comparisons.

By way of example only and not by way of limitation, the electronic device 154 could be a personal computer (PC) with an input/output device 158 (e.g., keyboard, mouse), the electronic device 152 could be a cellular or a mobile phone (a "Smart Phone" as understood by one of ordinary skill in the art), and the electronic device 156 could be a tablet device or a video gaming console, or the like.

Systems of the present invention allow data collection at a single device, i.e., the router 160, for identifying users with sessions. All of the network traffic of each single user of the electronic devices 152, 154, 156 is monitored. Therefore, for a single user, an identity of the user can be determined for each session since the data collection is occurring at the level of the router 160, rather than at higher TCP/IP or OSI layers. For example, for the electronic devices 152, different users may use the electronic device 152 at different times. A child may use the electronic device 152 during the afternoon to do school homework, and an adult may use the device later at night to watch a video. As discussed with respect to FIGS. 2 and 3, various parameters captured at the level of the router 160 may more accurately pin point specific users of the electronic devices 152, 154, 156 during each session.

The content servers 182, 184, or 186 usually are not directly connected to the router 160, and each data packet can take a different route from router 160 to the content servers 182, 184, or 186. Upon being communicated, for example to the content server 182, each packet is reassembled with the other packets to reconstruct the original data request from individual users of the electronic devices 152, 154, and 156. The content server 182 then retrieves data from the content 192, and processes the data for the return trip across the network to the users of the electronic devices 152, 154, and 156, typically in the same manner as the data request by the users from the electronic devices 152, 154, and 156. The browser software running on the electronic devices 152, 154, and 156 then reassembles the data packets to reconstruct data 192, and presents it to the users in a particular, usually an understandable form, and can be either static or dynamic, i.e., can itself include instructions for controlling the electronic devices 152, 154, and 156. For example, data 192 can include software instructions, such as instructions scripted in Java™ (provided by Oracle Corporation of Redwood City, CA) which are executed on the electronic devices 152, 154, and 156, for example, to update software thereupon.

For example, when a consumer using the electronic device 154 wants to place an order for a product or service that is offered through a merchant using server 182 on the World Wide Web (WWW), the user requests a particular data file in the data 192 from the content server 182. The data file oftentimes includes data that results in a form being generated by the electronic device 154 and displayed to the user. The user enters information into the form using the input/output device 158, and sends the filled-out form back to the server 182, including data representing what the user would like to buy, and payment information, such as credit card information. Other example usage scenarios include, watching video content or listening to audio content, receiving or sending data associated with video gaming and the like, or combinations thereof.

Figure 1C:
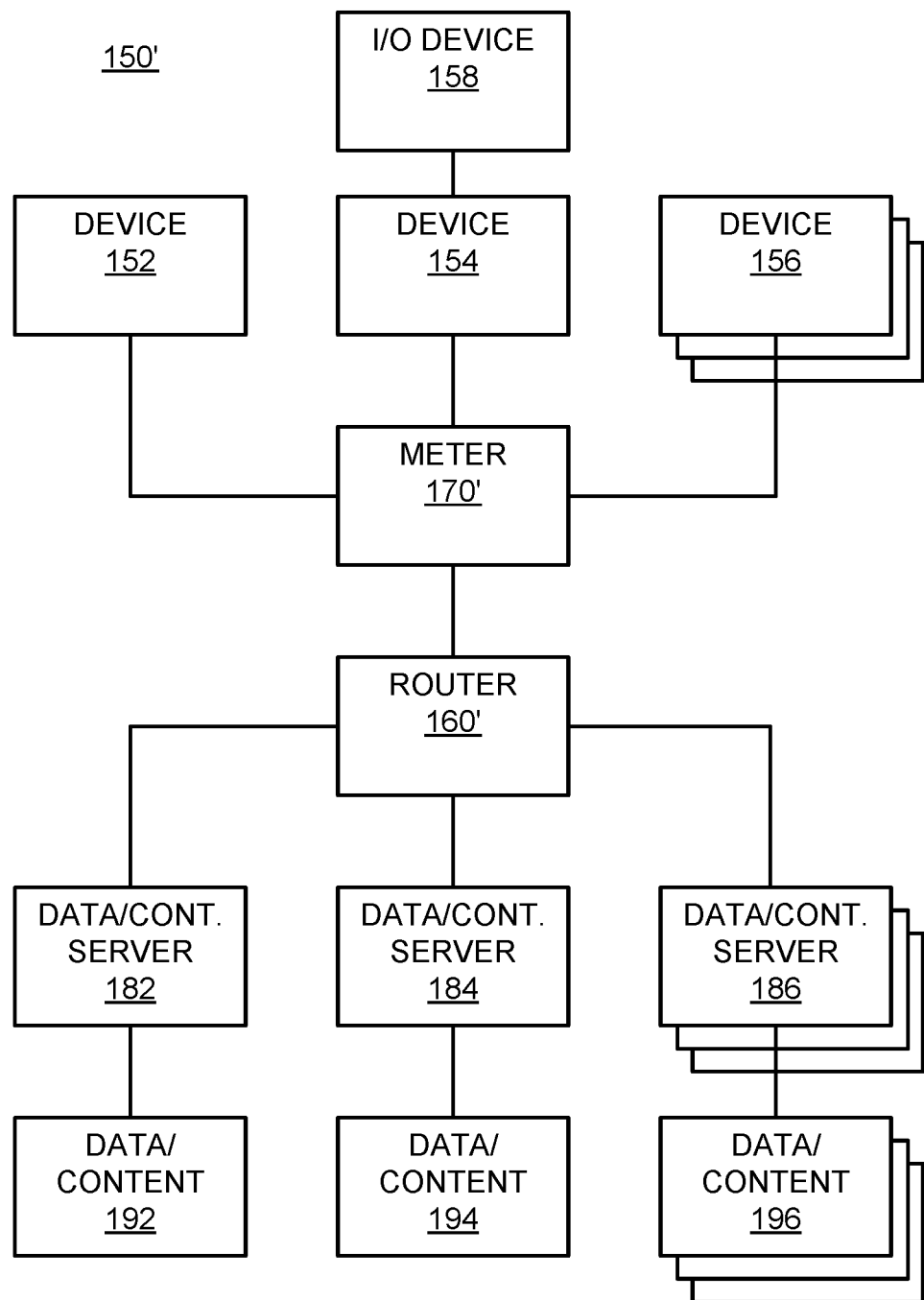
FIG. 1C illustrates another example traffic monitoring and/or device identification system.

FIG. 1C illustrates an alternative arrangement of a system 150' for metering and monitoring network traffic, which can be useful for positively identifying users and developing profiles associated with the device 152, the device 154, and the devices 156.

The devices 152, 154, and 156 (as well as the I/O device 158 or other elements functioning with the devices 152, 154, and 156) connect directly to the meter 170', which functions as the internet gateway. The meter 170' is communicatively coupled with the router 160'. In embodiments, the router 160' can be a standard router not possessing any functionality described herein (metering, identification, et cetera). In alternative embodiments, the router 160' can be a specialized router described herein which performs some aspects that are complemented by the meter 170'.

The router 160' receives outbound traffic from, e.g., the devices 152, 154, and 156, and/or other devices operatively coupled therewith via the meter 170' on the local network served by the router 160'. Such devices can include computers, mobile phones, smart entertainment or appliance devices, vehicles and telematics devices, et cetera. Traffic directed toward the devices (e.g., from the data/content servers 182, 184, and 186 or other remote devices or services) is received by the router 160' (e.g., from the Internet) and is appropriately distributed to a respective target device, in the system 150', by the meter 170'.

The meter 170' is configured to collect and log all transmissions by serving as the device's internet gateway, between the devices and the router within the local network.

In embodiments, the meter 170' can establish its own local network separate from the router. In other embodiments, the meter 170' can serve as an access point, repeater, gateway, et cetera for a common local network supported by the router 160'.

To ensure all devices, including the devices 152, 154, and 156 connect to the meter 170' rather than the router 160', the meter 170' is configured to assign network access to a user device. This may constitute fielding requests for new IP addresses, or handling IP address renewals, ahead of the router 160'. Router 160' is configured to assign IP addresses to the devices 152, 154, and 156 before the router.

In embodiments, the meter 170' can be configured to transmit (to, e.g., the devices 152, 154, and 156) a protocol connection offer. The protocol connection offer includes data for associating the devices 152, 154, and 156 with the local network. To ensure the devices 152, 154, and 156 connect via the meter 170' rather than the router 160', the protocol connection offer is transmitted before an offer from the router 160'. In further embodiments, the meter 170' is configured to receive an acceptance of the protocol connection offer from the devices 152, 154, and 156 and thereafter associating the devices 152, 154, and 156 with the local network. The meter 170' is then configured to serve as a gateway to the router 160' (and, through the router 160', the external network) and the local network. The router can further be configured to receive, from the devices 152, 154, and 156, a configuration protocol discovery message. The protocol connection offer may be sent in response to the configuration protocol discovery message. In further embodiments, IP address leases may be renewed where the devices 152, 154, and 156 were previously associated with the local network. The protocol connection offer is sent by the meter 170' in response to a timer associated with the router 160' (or the meter 170') which may be based on overall connection time or an idle time and is for renewing association of the devices 152, 154, and 156 with the local network. Timer length can vary from, e.g., minutes to days or any length.

In embodiments, this connection management can be handled through the Dynamic Host Configuration Protocol (DHCP). Meter 170' can function as a DHCP server, controlling DHCP conversations, even if IP addresses issued are sourced from router 160', and causing the meter 170' to function as a proxy within the local network itself rather than outside. A device attempting to associate with a local network can broadcast its media access control (MAC) address and a request to receive an IP address (DHCP discover message). Meter 170' can respond, then pass information to router 160' to allocate an IP address for the new device (DHCP offer). Acceptance (DHCP request) and confirmation of IP address lease terms (DHCP acknowledgement) can follow. Because meter 170' provides the IP address, it establishes itself as the connection point for the user device, and can therefore observe all traffic on all ports. This also avoids complications configuring outside components to cooperate with antivirus software, firewalls, et cetera. Traffic through the meter 170' can, in embodiments, be passed through network address translation (NAT).

Once the meter 170' establishes itself as the connection node and gateway for the devices 152, 154, and 156, it is configured to receive traffic directed to or originating from the devices 152, 154, and 156, wherein the routing device provides connectivity to an external network (e.g., the Internet), and wherein the devices 152, 154, and 156 connects to the meter 170' through a local network. Meter 170' is further configured to log, using the metering device, the traffic to and from the devices 152, 154, and 156 in a traffic log. Logging creates an entry including an origin of the traffic and a destination of the traffic (e.g., source IP, destination IP, destination port combination), and in embodiments may include further information about the traffic parameters, payload, et cetera. For example, a timestamp of the time at which the content was requested, or the traffic was transmitted can be included in the traffic log.

After logging the traffic, the meter 170' is configured to transmit the traffic. As the meter 170' serves as an intermediary, it therefore passes traffic to the router 160' for traffic with destinations outside the local network, or passes traffic from the external network or another device to a destination device on the local network. Thus, traffic to the devices 152, 154, and 156 is transmitted from the meter 170' to the devices 152, 154, and 156 after being received by the meter 170' from the router 160' after communication from the origin over the network. Traffic from the devices 152, 154, and 156 is transmitted from the meter 170' to the router 160' for communication to the destination over the external network. Further, inter-device traffic in the local network, which does not utilize the external network, is routed between the devices 152, 154, and 156 by the meter 170'. The meter 170' accordingly observes all communication traffic using the local network during its communication, improving over prior techniques using, e.g., proxy servers or other solutions. Further, by using a separate meter 170', resources of the router 160' are not taxed for monitoring, avoiding potential performance issues which may arise if the function of the router 160' is extended to perform additional tasks.

In embodiments, the meter 170' can be configured to perform additional functions locally. For example, the meter 170' can identify one or more of the devices 152, 154, and 156, and/or identify one or more users involved with a session originating therefrom. Data can be analyzed to discern patterns or improve profiles. The meter 170' can be configured to collect health metrics associated with the meter 170' or other devices in the local network. Other functionality described herein can also be performed at the meter 170'.

In embodiments, the meter 170' can be configured to extract, from the traffic, an identifier unique to one of the devices 152, 154, and 156 in the session. In further embodiments, the meter 170' can be configured to identify a device type of the one of the devices 152, 154, and 156 based on the identifier. In further embodiments, the meter 170' can be configured to identify a specific user of the identified device during the session based upon the identifier and identification rules, as well as associating the specific user with the session and the entry. The identifier or information for use with the identification rules can be discerned from, e.g., an agent hosted by the router 160', the one of the devices 152, 154, 156, or other elements with which they interact. Identification rules can include rules constraining the specific user to a predefined group of users. The predefined group of users can be, e.g., known users among one of a household or an office. Demographic rules can be applied to the traffic as part of the identification rules. Demographic rules can include a plurality of probabilities associated with an identification of the specific user with respect to each demographic indicator and the identifier.

More, meter 170' or other elements can be configured to statistically analyze the entry and entries from the traffic database to determine a trend associated with the traffic. Meter 170' can also use keyword rules as identification rules, and thus be configured to interrogate the traffic for keywords and comparing keywords from the traffic to a keyword registry associated with, e.g., the devices 152, 154, and 156.

In alternative or complementary embodiments, such functions can be performed by a remote component after the meter 170' provides logs or other data to the remote component. In embodiments, the meter 170' collects traffic data but analysis (e.g., user identification, pattern recognition) is performed at remote servers receiving or accessing traffic data.

In a particular embodiment, the meter 170' can include various component packages. A DHCP or network package of the meter 170' can be configured to obtain IP addresses for the meter 170' and the devices 152, 154, and 156 from the router 160'; provide IP addresses for itself and the devices 152, 154, and 156; monitor network saturation to avoid IP scarcity verify user acceptance of end user license agreements before enabling metering; handle identification of devices (using, e.g., DHCP fingerprinting) and rules which adjust client status and lease time based on fingerprints; measure amount of data sent and received in or to and from the local network (e.g., in bytes or other units); capture and report user data (e.g., by observing traffic or using agents installed to the devices 152, 154, and 156); identify and manage network extenders in the local network; and handle universal plug and play (UPnP) port mapping. A proxy package can be configured to proxy and post traffic sent through designated ports (e.g., port 80 and port 443; configurable through IP tables); maintain a configuration setting which determines types of traffic being captured at a device level; maintain a configuration certificate to define which servers are whitelisted for secure traffic at the operating system level; handle the download and implementation of rules governing proxy behavior; handle collection and posting of health logs (e.g., reflecting health of the meter 170'); handle changes to software of the meter 170'; handle posting of information to databases (e.g., a registration database); and handle communication between the DHCP/Meter and Proxy components.

Various subcomponents of the above-noted components can provide additional functionality. In embodiments, a subcomponent can be configured to run health checks on the meter 170' or other devices/components. Health checks can run periodically (e.g., hourly). Information such as uptime, memory usage, processes running, and system log messages from a previous period (e.g., last 75 minutes) can be sent as health reports. This subcomponent can trigger a reboot if the meter 170' or another device loses contact with the receiving server for more than 30 minutes.

In embodiments, a subcomponent can be configured to monitor for new software or firmware and conduct version changes. This subcomponent can run periodically (e.g., every 4 hours starting at midnight). A list (e.g., an XML list) of installed packages can be provided and a server can respond by identifying any packages requiring updates. This subcomponent can download and install later versions when present.

In embodiments, a subcomponent can be configured to manage device information. Functionality of the subcomponent can run periodically (e.g., every 15 minutes). One of the 2 ways to get a BID for a client device connected to RKM. This also serves as a way to post what is connected to the network currently (regardless of whether or not the device sees RKM as the DHCP server). This activity is also responsible for communicating changes to non-secure and secure collection for a particular device. Lastly, this package serves as an inter-process communicator between meter (DHCP) package and proxy package.

In embodiments, a subcomponent can be configured to collect and post data. Logging rules can determine data to be logged. In embodiments, the logged data can be stored in a buffer, and when the buffer is complete, it can be emptied to remote servers for storage.

Various rules can apply to the components and/or subcomponents. An example rule can relate to DCHP fingerprinting by changing IP address lease time and managing a blacklist of particular devices which could interrupt the meter 170' in its role as the gateway to the router 160'.

In another example, a rule can manage a whitelist by indicating which servers collect secure or non-secure data. Another example provides a rule for determining Secure Socket Layer (SSL) Certificate Authorities are downloaded and retained locally at the meter 170' (using, e.g., a local or shared Certificate Authority store). In another example, a rule can determine what headers can be modified by the meter 170' or other elements.

Another example rule can determine what traffic should be logged and what traffic should not be logged, or portions of traffic to be logged (e.g., full or partial page/post data). Another rule can manage fuzzification of whitelist and blacklist rules to explicitly enforce or repress fuzzification. Fuzzification can be used to remove personally identifiable information (PII). A similar example rule can provide for fuzzy whitelist management whereby if a key contains a whitelist value no fuzzification is performed regardless of previous fuzzification. Fuzzification rules and whitelists/blacklists can specify what data is fuzzified (e.g., hashed after removal of certain portions of data) based on types and patterns of data. In embodiments, whitelists can restore or replace certain aspects after fuzzification or exclude them from fuzzification while permitting related data to be fuzzified.

Another example rule can handle demographic reporting to define what data is used for identity determination associated with various sessions using various devices being proxied. Another rule can allow or deny cookie collection from secure sites based on whitelisting rules.

Various files can also be used to store data related to the meter 170' or other elements of system 150'. One or more such files can be encrypted. In an embodiment, a persistent file can contain information such as a MAC address assigned to a device by another element of the system 150' (or various remote elements associated with the meter 170'), unique identifiers assigned to the meter 170' or various devices 152, 154, 156 (which can include but are not limited to browser identifiers), fake MAC addresses in use (e.g., where extenders are present in the network; extenders may modify MAC addresses for connected devices to assist with routing in the local network), and DHCP fingerprint information (e.g., identifying an associated device; aiding the conversation to associate the device with the local network).

In embodiments, an encrypted configuration file can contain URLs for web calls, rules and other settings that the meter 170' (or hardware associated with functionality thereof) uses, and/or RKM BID. In embodiments, a file can contain details for sending information from PM to the proxy package while the device information package is running (e.g., sending lists of devices on the local network). In embodiments, a mapping filed can be used to connect fake MAC addresses to real MAC addresses (e.g., when Wi-Fi range extenders are in use on the network). A file can further contain white list server information and/or device information, MAC addresses, IP addresses, SSL and DHCP settings sent/received while provisioning device information for the devices 152, 154, 156, and providing unique identifiers for the devices 152, 154, 156.

In embodiments a file or folder can contain SSL certificates managed according to certificate management rules. Certificates are provisioned according to platform-specific procedures to establish safe "man-in-the-middle" status for the meter 170' (or other elements in alternative embodiments). A certificate establishing a secure connection with the devices 152, 154, 156 is used by the meter 170' for communicating with the devices 152, 154, 156, and a certificate establishing a secure connection with the router 160' and/or servers in an external networks accessed there through is used by the meter 170' for communicating with other entities. The stored files and rules can add and remove certificates based on the periods during which they are valid and whether or not trust is established or lost with particular Certificate Authorities.

Various log files can be maintained including a log that contains activity specific to the network package. Certain log files may or may not be enabled by default. Another example log can contain activity specific to the proxy package (connections opened and closed). Another example log can maintain details relating to evaluation of each datapost record according to collection rules. Such collection rules can determine what URLs, servers, origins, or addresses are relevant to the data collected and provisioned by the meter 170'. For example, sensitive domains (e.g., top level domains such as .mil or .gov; specific domains which may include healthcare information) can be excluded while e-commerce sites or smart device services can be included. Such logs and rules can be dynamic and modifiable based on changing rules or analysis of data collected (e.g., provide additional filters to focus on information that is useful after analysis). Another example log can include a system log that is parsed in conjunction with device health checks and reports. In embodiments, content from the network package and/or proxy package logs can be piped to the system log. These and other files can be updated during registration and continued activity.

Privacy or additional control can be provided, or irrelevant traffic discarded, in various manners. The meter 170' can be configured to determine a captured traffic type and a non-captured traffic type such that only captured traffic is logged while non-captured traffic is allowed to pass through. In embodiments, a device associated with non-captured traffic may be permitted to connect to the router 160' directly to avoid the meter 170' as an intermediary. This can be performed by declining to offer the non-captured device an IP address, or disconnecting the non-captured device from the meter 170' and allowing the router 160' to send the subsequent connection traffic. In embodiments, rules can be used to specify what data is observed, logged, or otherwise encountered. Rules can be general or platform-specific with respect to either the network infrastructure or a user device (e.g., by operating system, hardware, applications present).

In embodiments, meter 170' or another element of system 150' can be configured to cause installation, to one or both of the router 160' and the devices 152, 154, and 156, of software configured to facilitate interoperability with the metering device. In this regard, if specialized software is required to facilitate logging or other interoperability with meter 170' (or other aspects of system 150'), such firmware, agents, apps, et cetera can be provided to the router 160' the relevant devices 152, 154, and 156.

In a particular embodiment, the router 160' or another device (e.g., among devices 152, 154, and 156, or others) to receive a software installation can be detected using a web-based download to one of devices 152, 154, and 156. For router 160', a set of rules for the router 160' can be downloaded which contains a default IP range for the original firmware, credentials for accessing the original firmware, functionality for backing up the router configuration, an address for downloading a new firmware image for the router 160', and instructions for setup and configuration. For any device, similar techniques can be used to determine capabilities and settings, complete backup, and identify an agent or application for installation. In embodiments, a database can be maintained to store one or more of device capabilities and configurations, device firmware images, agents, applications, backups, et cetera. One or more databases can include IP tables associated with various hardware, root and wildcard certificates, MAC addresses of devices, and other relevant information. Automatic, manual, or semi-automatic (requiring some user action but automating other aspects) installation can occur thereafter. Uninstallation and "remote kill," (e.g., on-demand remote disablement of a modified router that logs data or interacts with a meter 170' with or without install) can be utilized to allow deactivation at any time by users or support specialists.

As discussed above, devices connecting the meter 170' need not be limited to computers or mobile phones, and one or more of devices 152, 154, and 156 may be internet-of-things devices or other devices.

Figure 2:
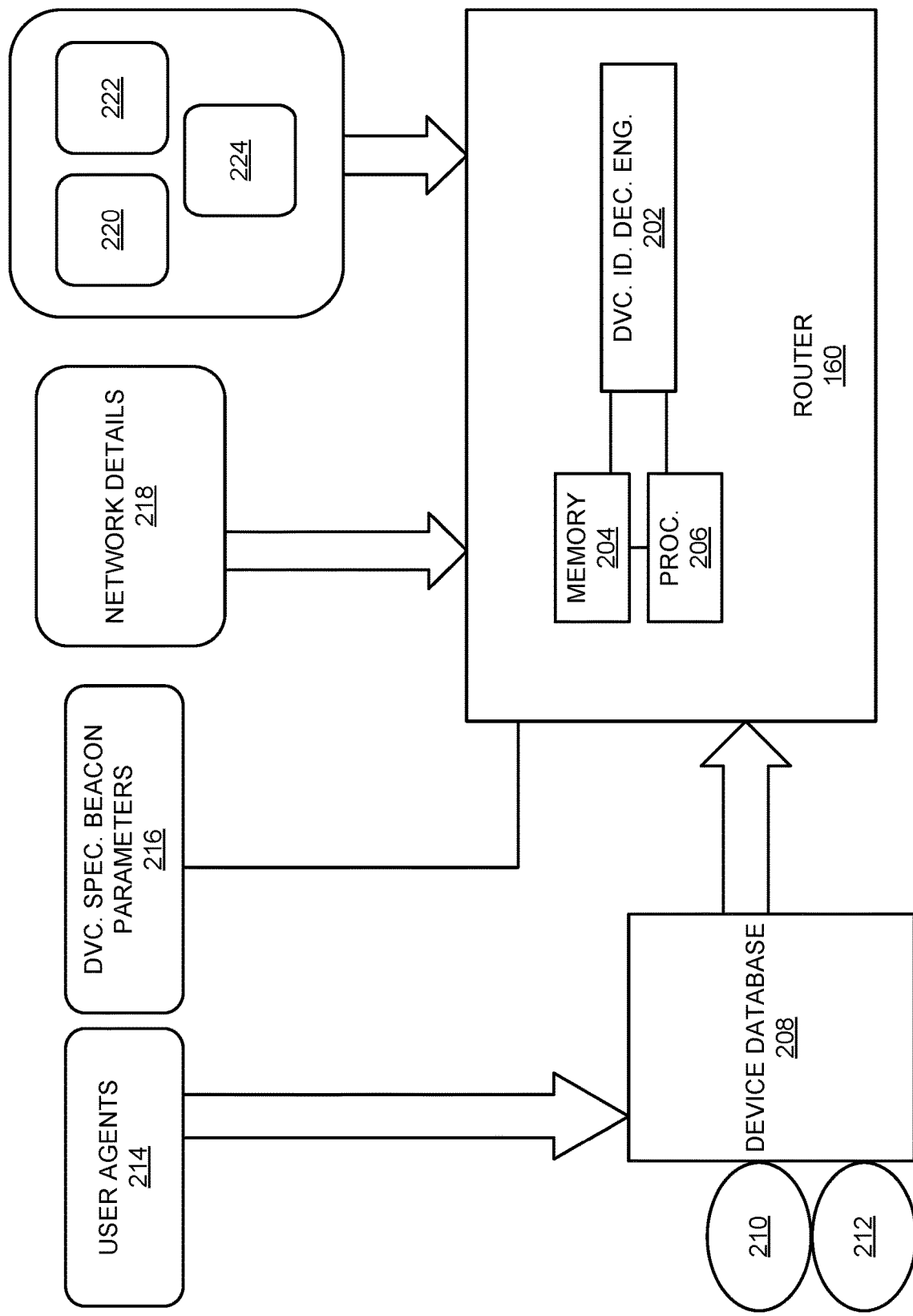
FIG. 2 is a block diagram of details of the example device identification system.

Referring to FIG. 2, a flow of data to and from the router 160 is illustrated in accordance with an aspect of this disclosure. The router 160 includes a device identification decision engine 202, a memory 204, and a processor 206. The router 160 may include additional hardware components, middleware components, software components, and the like, or combinations thereof. Such components may include, but are not limited to, co-processors, network interface cards, input-output ports, connection status indicators, antennas, display(s), and the like.

In one aspect of this disclosure, the device identification decision engine 202 may be implemented as part of a programmable logic array (PLA) with software executable configuration to assist the processor 206 to carry out the various features and functionalities of this invention. In another aspect, the device identification decision engine 202 may be implemented as instructions written as code executable by the processor 206. Such instructions when executed by the processor 206 cause the processor 206 in the router 160 to carry out the device identification method 300 illustrated in FIG. 3. Regardless of the physical implementation of the device identification decision engine 202, the device identification decision engine 202 handles data parameters for network sessions through the router 160 that enable the router 160 to output data identifying individual users of the electronic devices 152, 154, 156 for each network session active on the router 160.

In one aspect, the router 160 may be coupled to a device database 208 via the communication channel 16. The device database 208 is resident on each of the electronic devices 152, 154, 156, although only one device database is illustrated in FIG. 2. Alternatively, the device database 208 may be remote from the electronic devices 152, 154, 156. The device database 208 may store, or may further be coupled to, a registration database 210 for keywords input by each of the electronic devices 152, 154, 156 during each network session through the router 160, or even at other times when the electronic devices 152, 154, 156 are not in a network session over the router 160. The registration database 210 may be a primary source of User Demographic Reporting (UDR) that the router 160 may use that may match against other forms of inputs to the router 160. UDR indicators as ways to personally match a person to a user and site session may include, but are not limited to: first name, last name, email, gender, and birth year. In addition, a browser identifier ("browser_idc") at each of the electronic devices 152, 154, 156 and a person identifier ("person_id") are carried over to distinguish members within each household.

In order for the registration data in the registration database 210 to be used in a workable and updateable manner without the risk of tampering with the primary registration database, a separate database may serve as a replica to the primary registration database that may house only the five UDR indicators and their corresponding browser_idc and person_id. This replica is called the UDR "Dictionary" herein. The UDR "Dictionary" may maintain known indicators for each person within the household. The UDR indicators may represent UDR information collected from the registration database, transaction data and a UDR Form Data process that generates forms filled in with user information for each of the electronic devices 152, 154, 156. Thus, the "Dictionary" may maintain known unique values for each UDR indicator per member within each household.

For example, member "john" might have two different email addresses and both of which are maintained within the UDR "Dictionary" for "john". The initial load of registry data (the registrants) extracts only those current active households (browser_idc) and members within the household in addition to their corresponding UDR indicators in an implementation where this processing occurs at the router 160.

The device database 208 may further store keyword priority rules 212. The keyword priority rules 212 may be in the form of a lookup table to assign a priority level or value to the keywords input by each of the users of the electronic devices 152, 154, 156. The collection of these keywords and corresponding values may be captured at the level of the router 160 and then a series of business rules/logic in the keyword priority rules 212 that weeds out useless data and sorts the raw records into a workable model. The processed data may then be matched to the registration database 210 to identify the member within the household to which it belongs. If no match exists, a "dummy" person user profile may be created within the registration database 210. An example of keywords is illustrated in Table 1 below:

TABLE 1

| Category | Keyword |
| --- | --- |
| Name | first name, frame, last name, lname, first, last |
| Email | email, user email, recipient email, member-email |
| Login/Screenname | login, account name, signin, screenname |
| Gender | gender, sex, male, female, intgender |
| Date of Birth | dob, birthday, birthyear, byear, b month |

In one aspect, the device database 208 may be part of the router 160. In this aspect, the router 160 may then log all or some keywords from each user on respective sessions initiated from the electronic devices 152, 154, 156.

Each electronic device 152, 154, 156 may include user agents 214 installed thereupon. The user agents 214 may identify, among other things, a type of each of the electronic device 152, 154, 156 (e.g., based on an operating system type). The user agents 214 may be installed individually on each of the electronic devices 152, 154, 156 as a software application or applet. The user agents 214 may begin executing automatically every time each of the electronic devices 152, 154, 156 may start, and/or every time a new network session is established by the electronic devices 152, 154, 156. For example, for a desktop computer or a laptop, the user agent may identify whether the operating system is Windows® from Microsoft Corporation of Redmond, WA or MacOS® from Apple, Inc. of Cupertino, CA In one aspect, the user agents 214 may get the keywords and lookup the UDR "Dictionary" to identify specific users for specific sessions on each of the electronic devices 152, 154, 156.

The router 160 is configured to collect data about user habits, preferences, uses, and the like, and carry out a device identification method (illustrated in FIG. 3) to identify specific users of each session initiated by the electronic devices 152, 154, 156 using this data. Data representative of users' individual identity (rather than only that of the electronic devices' 152, 154, 156), the consumer's behavior, including (but not exclusively) what choices the user makes, why particular characteristics of a product or service are important, what products or services a consumer has considered and decides not to purchase, and how much money a consumer (user) is willing to pay and has paid for a product or service, can be a valuable product in itself. The quality of the data, e.g., statistical significance and error, greatly impacts how valuable the data is to a party wanting to know about a particular consumer's habits. The user agents 214 may provide these metrics to the router 160.

The router 160 may receive device specific beacon parameters 216 from one or more of the electronic devices 152, 154, 156. For example, when the electronic device 152 is a mobile phone, the router 160 may know if the mobile phone towers have changed with the users. A first user of the electronic device 152 may use the electronic device 152 inside a home where the router 160 is placed. The router 160 will know a corresponding nearest cellular tower for the home. The electronic device 156 may then be taken to a location (e.g., a school) and this may result in a change of the cellular tower registered at the electronic device 156. When the electronic device 156 returns to the home, the router 160 may obtain this changed cellular tower information to gain insight as to who a user of the electronic device 156 might be (e.g., a child) during the period that cellular phone tower was communicating with the electronic device 156. As will be understood by one of ordinary skill in the art, the mobile phone is usually within a range of at least three cellular phone towers so that triangulation techniques may be utilized to pin point the location of the mobile phone at a desired granularity.

The router 160 may obtain basic network details 218 associated with each of the electronic devices 152, 154, 156. Such network details may include obtaining host name(s), Medium Access Control (MAC) address(es), Internet Protocol (IP) address(es) of the electronic devices 152, 154, 156 having network sessions via the router 160. The host name may include a device name of the electronic devices 152, 154, 156. The MAC and IP addresses may then be used along with the host name to cross-check and validate the specific users for each session of the electronic devices 152, 154, 156.

The router 160 may obtain Universal Plug and Play (UPnP) messages 220 from the electronic devices 152, 154, 156. The UPnP messages may indicate to the router 160 if and how the electronic devices 152, 154, 156 have communicated with each other. Such communication information may then be processed by the router 160, e.g., using the device identification decision engine 202, to identify users for each session initiated by the electronic devices 152, 154, 156. For example, the UPnP messages 220 may include information about whether a video gaming console was attached to the electronic device 154 and what type of video game was subsequently played. From this, the router 160 may come to a decision that a specific user had used the electronic device 154 at a particular time based upon the UPnP messages 220. Likewise, the UPnP messages 220 may include information about connectivity of a wireless headphone, e.g., late at night, to the electronic device 152 and come to a conclusion about an adult listening to an audio without disturbing other members of the household (e.g., a sleeping child/infant).

The router 160 may obtain port and protocol usage data 222 for each of the electronic devices 152, 154, 156. For example, a type of port for the electronic device 154 and specific communication protocol being used by the electronic device 154 may indicate what is happening in the session established at the electronic device 154. In another example, the electronic device 152 may be communicating with the electronic device 156 to synchronize music files over a Bluetooth protocol. The router 160 may obtain this information to determine identity of the user(s) of the electronic devices 152 and/or the electronic device 156 based upon music preference of the users of the electronic devices 152, 154, 156, such music preference being available to the router 160 from the device database 208, for example. Likewise, the router 160 may obtain information about data input and output from each port of the electronic devices 152, 154, 156 to identify a specific user associated with each of the sessions of the electronic devices 152, 154, 156. For example, the router 160 may have data about a typing speed and typing pattern of a first user in the household to be different from that of a second user of the household. In collaboration with information from the user agents 214, the router 160 may then use this information about typing speeds and patterns to make determination regarding the user identity during a network session.

The router 160 may further utilize data associated with a dynamic host control protocol (DHCP) information 224 for each session of the electronic devices 152, 154, 156 with the router 160. The DHCP information 224 may depend on whether IPv4 or IPv6 is being deployed for the electronic devices 152, 154, 156. In one aspect, the router 160 may obtain lookup information from a third party database (not shown), e.g., www.fingerbank.org ("Fingerbank"), for device fingerprints. Fingerbank accurately determines what kind of device is connected on a network based on its MAC address, its DHCP fingerprint and a corresponding User-Agent in the user agents 214. The router 160 may then correlate the information from the third party database with the user agents 214, the basic network details 216, and the DHCP information 224 to identify specific users with the specific sessions of the electronic devices 152, 154, 156.

In one aspect, the router 160 may provide cookies and site affinity information to the device identification decisions engine 202. The router 160 may utilize open source tables and historical browsing information from the electronic devices 152, 154, 156 to infer the specific user's identity on any of the electronic devices 152, 154, 156 on any of the sessions established therefrom. For example, the router 160 may determine a social network profile of the specific user and know which other web pages the specific user was browsing. Based upon both these sources of information, the router 160 may, for example, determine a gender of the user of one of the electronic devices 152, 154, 156 from which such session for browsing was established. Further, based upon the registration database 210, the router 160 may know that there is, for example, only one female member associated with the electronic devices 152, 154, 156 in the household. Then, based upon the social network profile and the website browsed by one of electronic devices 152, 154, 156 (e.g., a female clothing website), the device identification decision engine 202 may exactly know who the specific female user for the electronic devices 152, 154, 156 was at the time the website was browsed.

Methods in accordance with the present invention collect and generate data which is extremely complete for an individual user on a session by session basis at the level of the router 107b, and therefore can be very useful by itself or when correlated with other data about that user, or other consumers that share characteristics with the user. Furthermore, in implementations of the present invention that do not rely on client-side data collection, but instead utilize collection of data at the router 160, the impact on the performance of the individual consumer's electronic devices 152, 154, 156 is minimal, and does not require repeated software updating as with prior systems which were resident on the electronic devices 152, 154, 156.

While FIG. 2 is illustrated with respect to router 160 of FIG. 1B, it is understood that some or all of the aspects described above can be performed by or in conjunction with meter 170' in embodiments using router 160'. Router 160' may be a standard router not including metering, monitoring, logging, identification, or other functionality, but all aspects described with respect to FIG. 2 may still be performed in system 150' through realization of such functionality in meter 170' without departing from the scope or spirit of the innovation.

Figure 3:
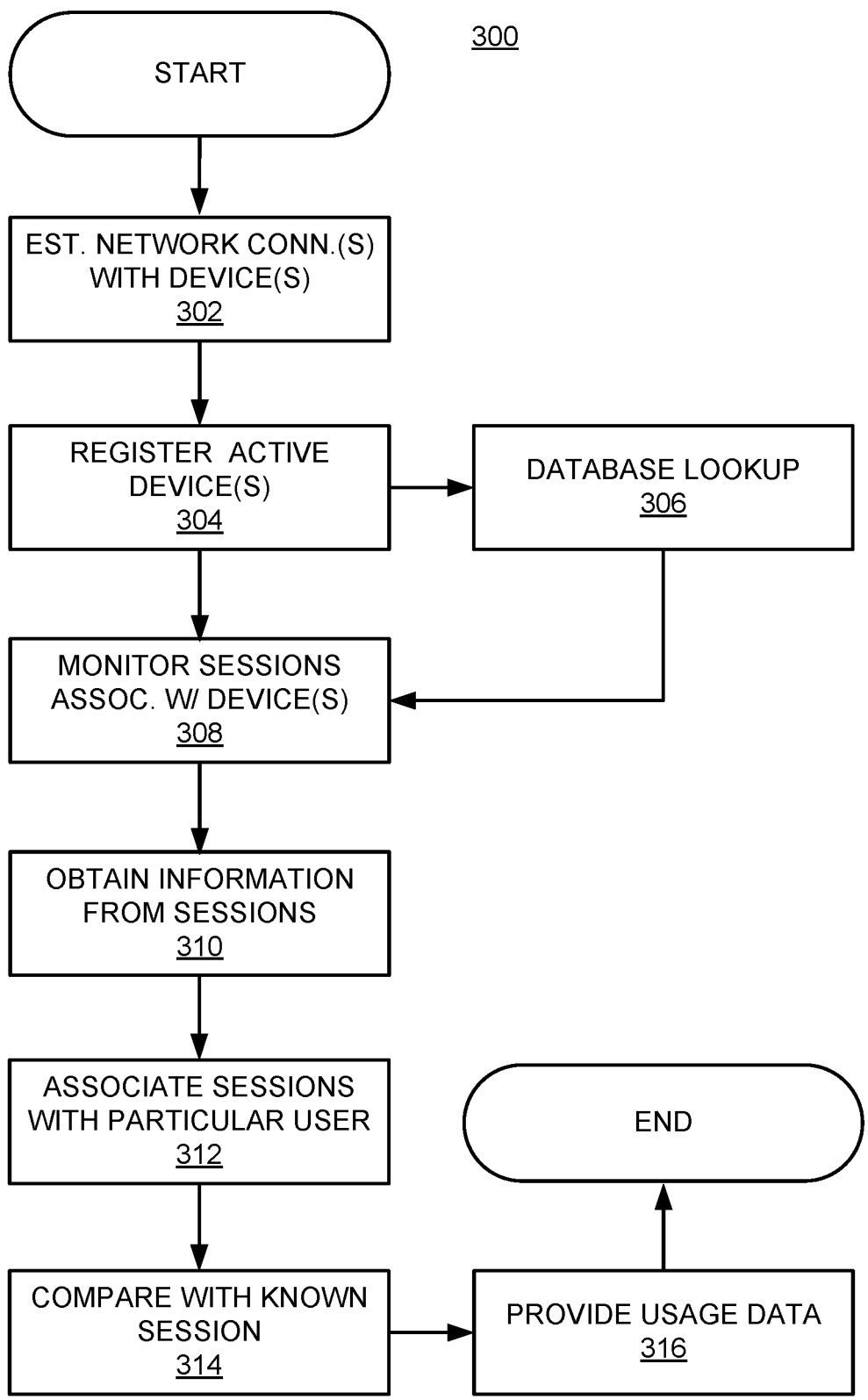
FIG. 3 is an example device identification method.

An example of a device identification method 300 is provided in FIG. 3, in accordance with an aspect of this disclosure. One or more of steps 302-316 of the device identification method 300 are implemented at the router 160 using hardware, software, firmware, and/or middleware, or combinations thereof. For example, the steps 302-316 may be implemented by the processor 206 based upon processor executable code residing on the memory 204 and by using logic implemented by the device identification decision engine 202.

The device identification method 300 may begin in a step 302 where the router 160 may receive a request to establish a network session from one or more of the electronic devices 152, 154, 156. Such a network session may be established using conventional techniques understood by one of ordinary skill in the art.

In a step 304, the router 160 may register each of the electronic devices 152, 154, 156. The router 160 may register the devices using MAC identifier, IP address, and/or device name. The router 160 may classify the electronic devices 152, 154, 156 as active or passive devices. An active device may be one that has an active network session serviced via the router 160 and a passive device may be one that is in wireless communication with the router 160 but does not have any requests for a session that are to be serviced via the router 160.

In parallel with the step 304, in a step 306, the router 160 may carry out a look up of the device database 208. The device database 208 may provide matching information corresponding to the electronic device 152, 154, 156. Based upon the information received from the device database 208, the router 160 may use the device identification decision engine 202 to compare with the registration information from the step 304 and come to an identification of the device with respect to a make and model information of the electronic devices 152, 154, 156. The make and model information may be include detailed hardware, operating system, and software specifications of the electronic devices 152, 154, 156, although the router 160 may be programmable to select a level of detail with respect to the make and model information of the electronic devices 152, 154, 156. It will be appreciated that even with such make and model information, the router 160, at the end of step 306 may at best only be able to associate some users with the electronic devices 152, 154, 156. However, the router 160 may not yet be able to identify the exact users of the electronic devices 152, 154, 156 with respect to the specific network sessions being serviced via the router 160.

In a step 308, the router 160 may monitor the one or more network sessions established in the step 302. The router 160 may perform such monitoring by extracting information from headers and/or trailers of data packets associated with the network sessions. In a step 310, the router 160 may obtain a plurality of parameters to determine a specific user associated with each network session of the electronic devices 152, 154, 156. In one aspect, the router 160 may obtain keywords via the user agents 214 on each of the electronic devices 152, 154, 156. The keywords may be provided directly to the router 160 by the user agents 214. Alternatively or additionally, the keywords may be obtained by the router 160 from the registration database 210 that logs in the keywords from the device database 208 for each of the electronic devices 152, 154, 156. As indicated in Table 1 above with examples of keywords, the processor 206 may parse the keywords to obtain a user identity of a specific user associated with a specific device in the electronic devices 152, 154, 156 for a specific session of electronic devices 152, 154, 156. The identity of the specific user based on the keywords may be used by the router 160 as an independent criterion to arrive at a confirmation of the user identity. Alternatively, the router 160 may use the keyword as one of a plurality of criteria to determine the identity of the specific user for a given network session associated with the specific user at one of the electronic devices 152, 154, 156. By way of example only, the router 160 may identify the specific user using the user agents 214 96% of the times, whereas the router 160 may use other forms of identification techniques discussed herein for the rest 4% of the times.

Still in the step 310, the router 160 may look at the MAC address of each of the electronic devices 152, 154, 156 to obtain the manufacturer (model and make) of each of the electronic devices 152, 154, 156. The MAC address obtained may then be cross checked and validated with the device database 208. The router 160 may determine, using the device identification decision engine 202 logic, a name of an owner of one or more of the electronic devices 152, 154, 156 that have an active network session (i.e., an active device) with the router 160. When the identity of the specific user based upon the keywords and based upon the MAC address are the same, the router 160 can come to a determination of identity of the specific user associated with a particular network session with a high level of probability. The router 160 may use additional parameters to further confirm the identity of the specific user with the specific network session, as discussed below.

Alternatively, the router 160 may determine that the user identity from the MAC address is different from the user identity from the identity of the user determined using the keywords. For example, a device in the electronic devices 152, 154, 156 may be owned by a mother in the household, whereas the keywords captured (e.g., user email id) may correspond to the daughter's identity. Accordingly, the router 160 may not yet be able to confirm the identity of the user associated with a specific network session from that device. In this scenario, the router may fill in additional profile information from DHCP information 224. One example of the DHCP information 224 is a DHCP Fingerbank at fingerbank.org, understood by one of ordinary skill in the art. The router 160 may communicate with a third party database (not shown) to obtain the DHCP information 224, for example, to fill in information particular to the specific user and/or to obtain additional parameters of information that can assist the router 160 to come to a determination of the specific user in the network session. For example, a monthly data usage, browsing pattern, etc. may be obtained from the third party database to determine that it was the daughter and not the mother in the household who was associated with the monitored network session.

The router 160 may further obtain the IP address and/or the host name of each of the electronic devices 152, 154, 156. The IP address may be looked up to determine if a specific device in the electronic devices 152, 154, 156 is permanently associated, mostly associated, or associated for a particular network session. From this information about the IP address, the router 160 may make another independent determination about the user identity of the specific user for a specific session on the router 160. Likewise, the router 160 may independently determine an identity of the specific user for a specific session using the host name. Each such determination may be assigned a probability or likelihood or accuracy level. The router 160 may then weigh such probabilities to select the most probable user identity of a specific user. Alternatively, the router 160 may calculate a composite probability or accuracy with which the specific user of a specific network session is identified at a specific device in the electronic devices 152, 154, 156.

In one aspect, the router 160 may determine whether the specific device in the electronic devices 152, 154, 156 is operating per IPv4 standards or IPv6 standards (understood buy one of ordinary skill in the art). The router 160 may use this information to determine a type of DHCP being utilized by the specific device. For example, a newer device may only use IPv6. The router 160 may have previous information that a particular member of the household in which the electronic devices 152, 154, 156 are used only uses the latest electronic devices available in the market whereas the other members of the household do not care much about the particulars of the in the electronic devices 152, 154, 156. From this information, the router 160 may assign a probability level to the identification of the household member just based on the use of IPv6 for the newer device, or may apply the use of the IPv6 parameter as another parameter in the overall device identification method 300 to identify the specific user with the specific network session from that device.

Still in the step 310, the router 160 may obtain time stamps of the network sessions from each of the electronic devices 152, 154, 156. Such time stamps form another parameter for the router 160 to establish the user identity of the specific user of a specific network session. For example, the router 160 may know that a particular household has an adult and a child as the only members using the electronic devices 152, 154, 156. The router 160 may further know that at a given time during a school day, one of the electronic devices 152, 154, 156 was used to watch a movie unsuitable for children. Still further, the router 160 may detect that one of electronic devices 152, 154, 156 is missing from the household and is instead in an external cellular network (e.g., based upon a user agent in that electronic device transmitting the location of that electronic device to the router 160) that is in a school area, and a social network profile for a child was logged from the school area, but not from the household. From this, the router 160 may associate the network session with the adult in the household with a high degree of probability.

In one aspect of this disclosure, the router 160 may obtain the port and protocol usage data 222 from each of the electronic devices 152, 154, 156. Based upon electrical, communication, and software requirements for each port and type of protocol in use for the network sessions, the router 160 may identify the electronic devices 152, 154, 156 as well as the users associated with the electronic devices 152, 154, 156 who are actively using the network sessions. For example, the router 160 may detect a latest protocol version utilized by one of the electronic devices 152, 154, 156. The router 160 may know from the device database 208 that only one of the electronic devices 152, 154, 156 can support that latest protocol version and therefore, be able to identify the specific device. Further, the router 160 may know that to interact with a network session using that protocol, a sophisticated level of skill is required on part of the user and only one of the users in the household may have that skill (e.g., a specific certification on record). Accordingly, the router 160 may identify the specific user with a high level of accuracy based upon the protocol usage.

In a step 312, the router 160 may associate each network session with a specific user with a probability or likelihood threshold. The router 160 may come to a conclusion about a user's identity from two or more independent sources. For example, the router 160 may determine that a specific user's email address was captured at a given time during the session. Around the same time, a sign-in into a website was logged for the same user in which a specific port available only at one of the electronic devices 152, 154, 156 associated with only that user was monitored by the router 160. Accordingly, the router 160 may assign probabilities to each of these events and determine that a high probability exists for the user of the network session to be a specific user at one of the electronic devices 152, 154, 156. Such probabilities may be modified as the network session progresses or after the network session ends. The router 160 applies historical data usage and browsing patterns to assign probabilities. At least some of the probabilities may be conditional based upon previously known 100% probable identities of the users. Further, the processor 206 may compute different types of probabilistic models understood by one of ordinary skill in the art to update or calculate the probability of a specific user being associated with a specific network session.

In a step 314, the router 160 may compare all the data obtained in the step 310 with known parameters from the device database 208, the registration database 210, and/or other third party databases. The comparison may be done to verify that different pieces of information regarding the user identity for each network session supported by the router 160 match with each other. If there is a mismatch, using the device identification decision engine 202, the router 160 may apply rules to make a decision regarding the most accurate or the most likely user associated with a particular device for a particular network session through the router 160.

In a step 316, the router 160 may provide usage data of the electronic devices 152, 154, 156 for each user in a household for each network session to an external user. For example, an external server may obtain such usage data from the router 160 to improve the service quality for the users of the electronic devices 152, 154, 156 in the household. Such service quality improvements may be for customizing bandwidth availability, content availability and/or for promotional business purposes.

In various aspects of this disclosure, due to the fact that the device identification method 300 is being carried out by the router 160, the disclosure herein provides a deeper level of processing of user session data than possible using the conventional state of the art where a client side or a server side process is applied to obtain some general information about the users, and that too not on a session by session basis, but on a device by device basis, at best. The present disclosure overcomes the problem of resolving ambiguous situations where two different users may use a device and it is not possible to specifically identify the exact identity of each of those two users since the same device is being used.

Figure 4:
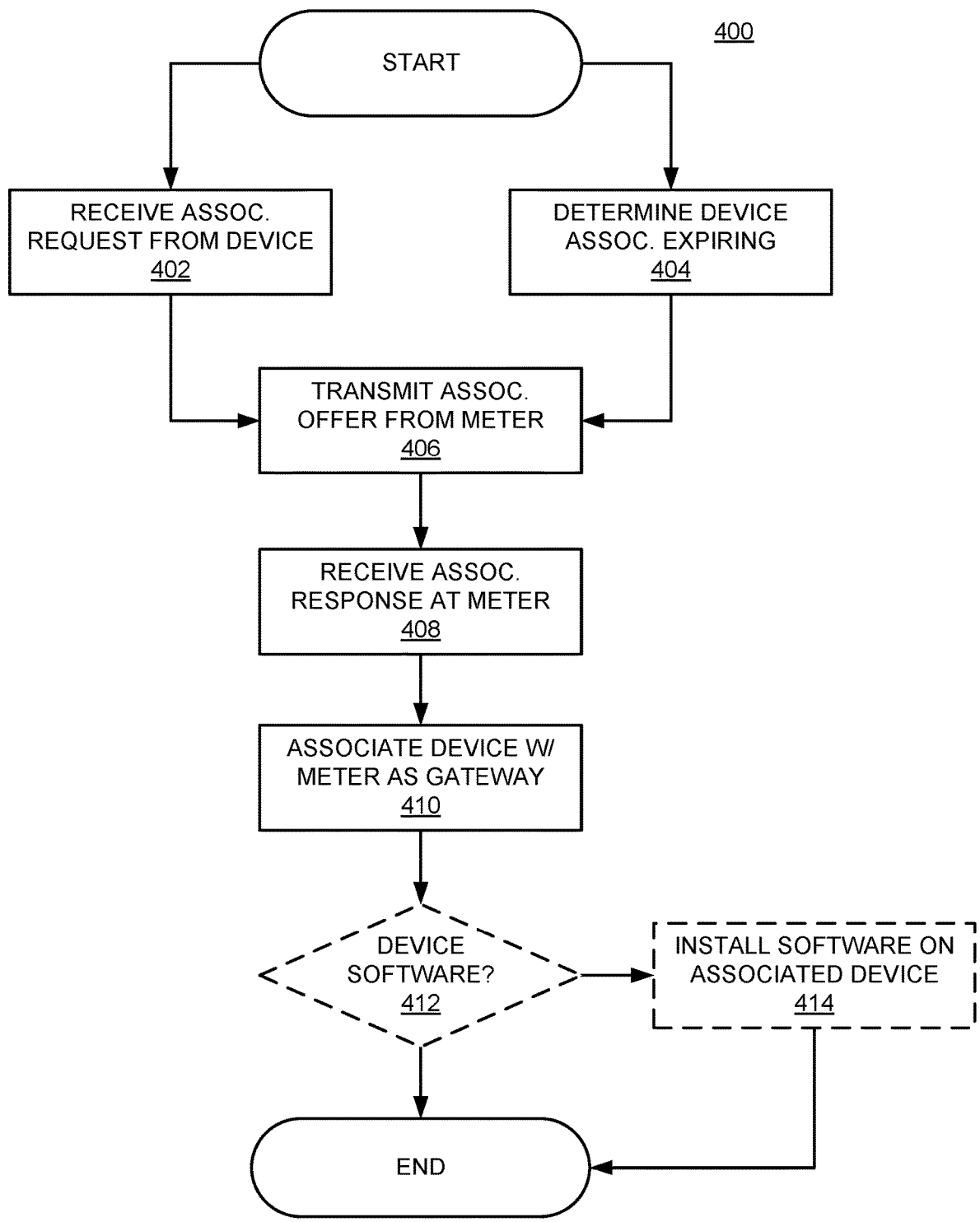
FIG. 4 is an example method for using an intermediary monitor in conjunction with a router.

FIG. 4 illustrates an example methodology 400 for associating a device with a meter disclosed herein as opposed to a router or other access point, thereby enabling the meter to act as an intermediary and log all traffic entering, exiting, and within a local network. Methodology 400 begins at 402 or 404 depending on whether it manages a device initially associating with the network or renewing a lease on an existing IP address.

If the device is not yet associated with the network, a communication exchange (e.g., DHCP conversation) can occur to associate the device with the network using a metering device beginning at 402. This aspect can include receiving, from the user device, a configuration protocol discovery message, wherein the protocol connection offer is sent in response to the configuration protocol discovery message.

If the device is already associated with the network (whether connected to the meter or another device), its lease can be renewed based on determining that an IP address lease timer is expiring at 404. This is performed when the user device is or was previously associated with the local network.

At 406, an offer for a (new or renewed) IP address lease is transmitted from the meter, rather than another element of the network. This aspect can include transmitting, from the metering device to the user device, a protocol connection offer, wherein the protocol connection offer includes data for associating the user device with the local network, and wherein the protocol connection offer is transmitted before an offer from the routing device. When directed to a previously associated device, a protocol connection offer can be sent in response to a timer associated with the routing device, and wherein the timer is for renewing the user device association with the local network.

At 408, a response can be received from the device by the meter to confirm association of the device with the network using the meter. This aspect can include receiving, at the metering device, an acceptance of the protocol connection offer from the user device.

At 410, the device can be associated with the network with the meter as the gateway for traffic. This aspect can include assigning, using a metering device operatively coupled to a routing device, network access to a user device and/or associating the user device with the local network, wherein the metering device is configured to serve as a gateway to the routing device and the local network.

At 412, a determination can be made as to whether the device now (or still) associated with the network, or other elements, require a software update for operability with the metering device. If the determination at 412 returns positive, at 414 software can be installed to the device or another component. This can include causing installation, to one or both of the routing device and the user device, of software configured to facilitate interoperability with the metering device. Thereafter, or if the determination at 412 returns negative, methodology 400 ends.

Figure 5:
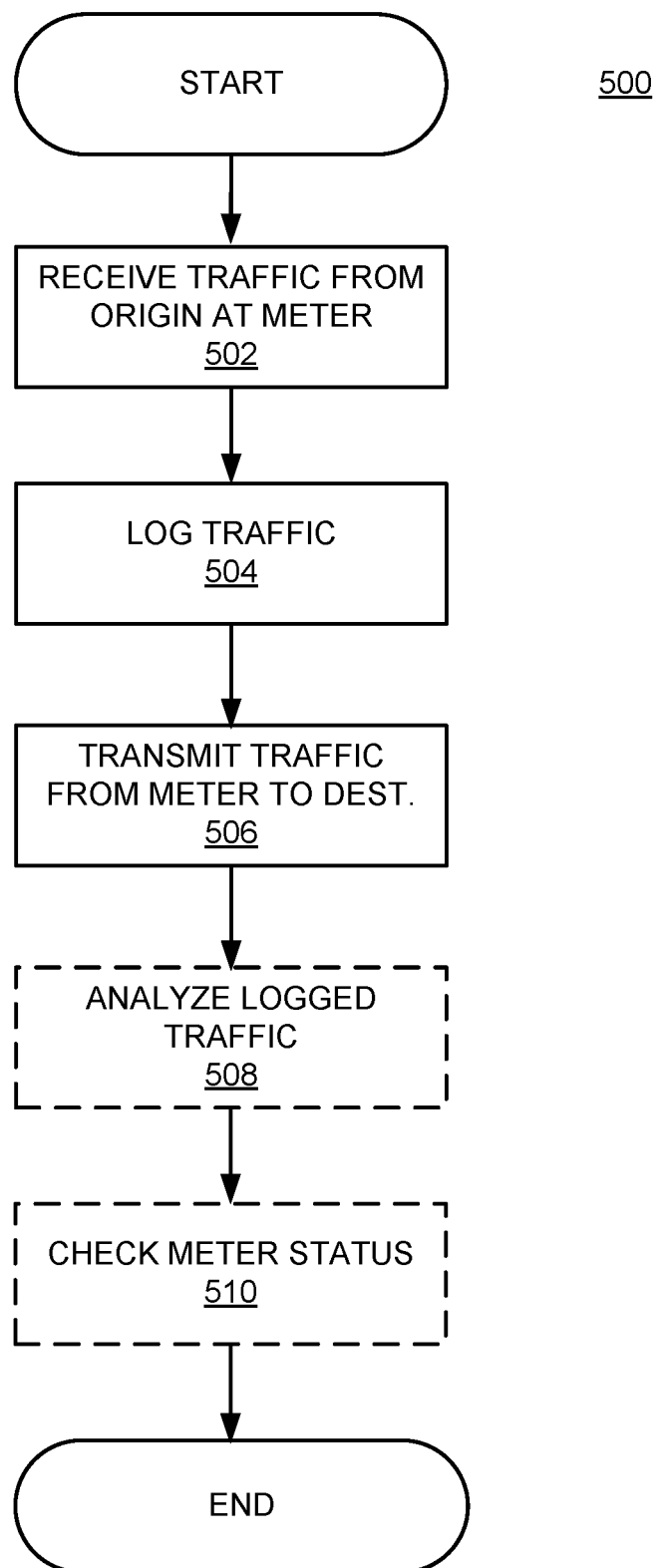
FIG. 5 is an example method for collecting data using an intermediary monitor in conjunction with a router.

FIG. 5 illustrates an example methodology 500 for logging traffic entering, exiting, and within a local network using a meter disclosed herein. Methodology 500 begins and at 502 receives traffic (originating at and/or destined for a device of an associated local network) from an origin (e.g., a device on the local network, traffic from an external network received via a router). In particular embodiments, this can involve receiving, at the metering device, traffic directed to or originating from a user device, wherein the routing device provides connectivity to an external network, and wherein the user device connects to the metering device over a local network.

At 504, the traffic is logged. In an embodiment, this includes logging, using the metering device, the traffic to and from the user device in a traffic log, wherein logging creates an entry including an origin of the traffic and a destination of the traffic. In embodiments page data, device data, app or service data, et cetera can comprise logged or captured traffic. In embodiments 504 can further include, or be preceded by, aspects for determining a captured traffic type such that the traffic is the captured traffic type but another traffic type is not logged.

At 506, after logging, the traffic is passed to its destination. This aspect can include transmitting, using the metering device, the traffic. Traffic to the user device can be transmitted from the metering device to the user device after being received by the metering device from the routing device after communication from the origin over the network, and traffic from the user device can be transmitted from the metering device to the routing device for communication to the destination over the network.

Various other aspects can be performed after logging based on analysis of the data. Various analyses can be performed, using the metering device or other resources, at 508. In another alternative or complementary embodiment, a status check of the metering device can be performed at 510. This status check can relate to the health of the meter, storage available on the meter, or other aspects. In embodiments, this can include collecting health metrics associated with the metering device. Thereafter, methodology 500 ends.

Figure 6:
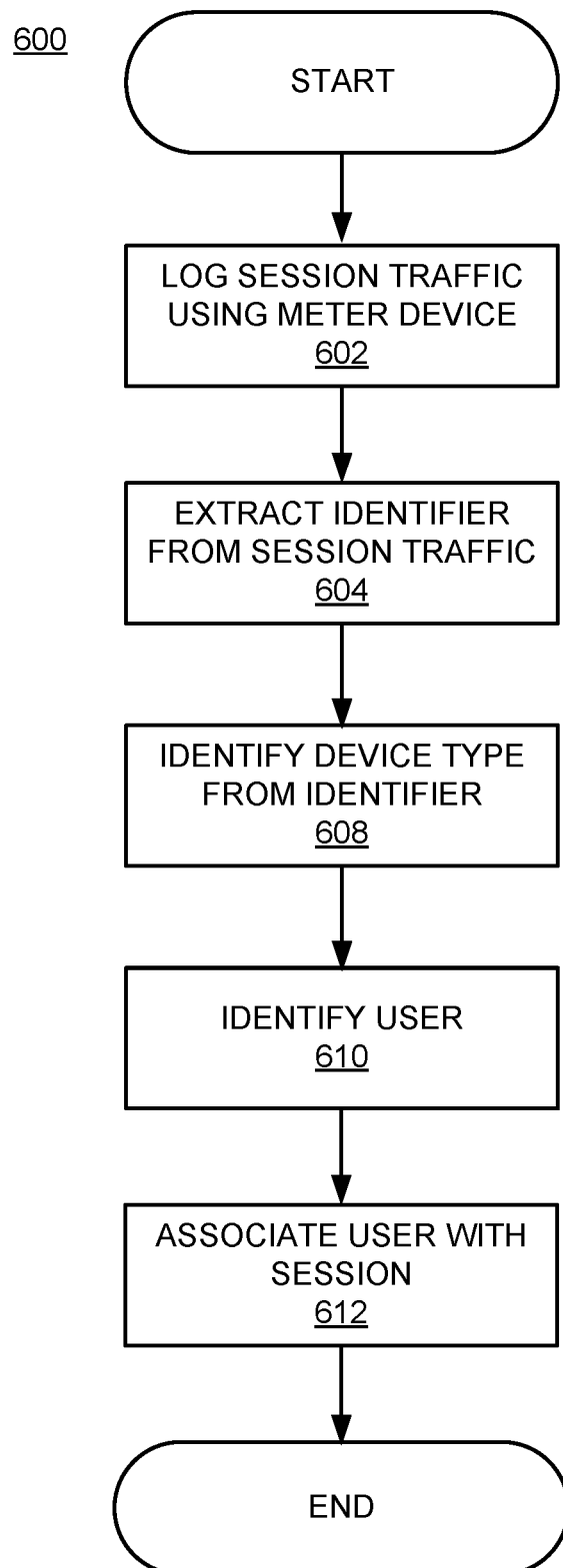
FIG. 6 is an example method for identifying a user associated with a session based on session traffic data logged.

FIG. 6 illustrates an example methodology 600 for identifying a user associated with a session based on session traffic data logged using a meter disclosed herein. Methodology 600 begins then logs session traffic using a metering device at 602. At 604, identifier information is extracted from the logged session traffic data. Such aspects can be performed at the metering device, or using other resources (e.g., available on the local network, available through an external network). In particular embodiments this can include extracting, from the traffic, an identifier unique to the user device in the session.

Thereafter, at 608, a device type can be determined. This can include identifying a device type of the user device based on the identifier. At 610, a user can be identified. This can include identifying a specific user of the device during the session based upon the identifier and identification rules. Based on this identification, at 612, aspects performed can include associating the specific user with the session and the entry. Identification at various steps can employ various rules. In an embodiment, the identification rules include rules constraining the specific user to a predefined group of users. In a further embodiment, the predefined group of users is one of a household or an office. In another embodiment, demographic rules can be included in identification rules. An example demographic rule can include a plurality of probabilities associated with an identification of the specific user with respect to each demographic indicator and the identifier. Thereafter, methodology 600 ends.

Various aspects disclosed herein can be realized using methodologies 300, 400, 500, and 600 even if not expressly described with respect to each method. For example, one or both of a user device or a routing device can host an agent for providing one or both of the identifier or information for use with the identification rules. Devices can be any type of device which transmits data over networks, including IoT devices.

Logs or logged traffic entries can be transmitted to a traffic database. In an embodiment an aspect can include statistically analyzing the entry and entries from the traffic database to determine a trend associated with the traffic. In alternative or complementary embodiments aspects can include interrogating, using the metering device, the traffic for keywords, and comparing keywords from the traffic to a keyword registry associated with the user device, wherein the identification rules include keyword rules.

Methods herein can include or exclude particular data for logging. In an embodiment, an aspect can include determining a captured traffic type, wherein the traffic is the captured traffic type, and wherein a second traffic type is not logged.

An embodiment in accordance with the present disclosure provides a device identification system. Another embodiment provides a device identification method. Yet another embodiment provides a non-transitory computer readable medium having instructions stored thereupon, which instructions when executed by a processor cause the processor to carry out a device identification method. Further embodiments provide for systems, methods, and non-transitory computer readable media containing instructions which assist with comprehensive metering and monitoring of traffic in a network.

The many features and advantages of the present disclosure are apparent from the detailed specification, and thus, it is intended by the appended claims to cover all such features and advantages of the present disclosure, which fall within the true spirit, and scope of the present disclosure. Further, since numerous modifications and variations will readily occur to those skilled in the art, it is not desired to limit the present disclosure to the exact construction and operation illustrated and described.

The invention claimed is:

1. A method for collecting traffic data on a network, the method comprising:
   receiving, at a metering device in communication with a routing device, traffic information associated with traffic to and from a user device,
   wherein the metering device, the routing device, and a plurality of user devices including the user device are location in the same premises, wherein the traffic information includes an origin of the traffic, a destination of the traffic, and a time stamp of the traffic, wherein the traffic information is associated with a plurality of sessions, and wherein the routing device provides the user device with connectivity to an external network;
   determining, based on a control, to capture a first part of the traffic information and not to capture a second part of the traffic information;
   receiving, at the metering device and from the user device, one or more parameters;
   transmitting, from the metering device and to a third-party server, the first part of the traffic information that is captured; and
   associating, based on the one or more parameters, a user of the user device with a session of the plurality of sessions.

2. The method of claim 1, wherein the one or more parameters include at least one of a device identifier of the user device or a user identifier of the user.

3. The method of claim 2, wherein associating the user with the session comprises associating the user associated with the user identifier included in the one or more parameters with the session.

4. The method of claim 2, wherein the user identifier is at least one of an email address associated with the user or sign-in information associated with the user.

5. The method of claim 2, wherein associating the user with the session comprises associating the user associated with the device identifier included in the one or more parameters with the session.

6. The method of claim 1, wherein the metering device is in communication with the routing device over a local network.

7. The method of claim 6, wherein the external network is different from the local network.

8. The method of claim 1, further comprising:
   sending, from the metering device, a protocol connection offer; and
   receiving, at the metering device, acceptance of the protocol connection offer.

9. The method of claim 1, further comprising establishing, based on the traffic information, the session.

10. The method of claim 9, wherein establishing the session comprises associating a plurality of traffic data associated with the user with the session.

11. The method of claim 1, wherein associating the user with the session comprises determining a probability of the user being associated with the session.

12. The method of claim 1, wherein the premises is a home or an office.

13. The method of claim 1, wherein the one or more parameters include keywords.

14. The method of claim 1, wherein the user is associated with the session at the metering device or at the third-party server.

15. The method of claim 1, wherein the control is a privacy control.

16. The method of claim 15, wherein the privacy control includes an identifier of an IP address or an identifier of a user device.

17. A system for analyzing traffic on a network, the system comprising:
   a user device located in a premises;
   a routing device located in the premises and in communication with the user device, the routing device configured to provide the user device with connectivity to an external network;
   a metering device located in the premises and in communication with the routing device, the metering device being configured to:
     receive traffic information associated with traffic to and from the user device,
     the traffic information including an origin of the traffic, a destination of the traffic, a time stamp of the traffic, and the traffic information being associated with a plurality of sessions;

determine, based on a control, to capture a first part of the traffic information and not to capture a second part of the traffic information, receive one or more parameters from the user device; and transmit the first part of the traffic information that is captured to a third-party server; and the third-party server in communication with the metering device, the third-party server being configured to receive the traffic information from the metering device, and the third-party server being configured to associate the user of the user device with a session of the plurality of sessions based on the one or more parameters.

18. The system of claim 17, wherein the third-party server is further configured to establish, based on the traffic information, the session.

19. The system of claim 17, wherein the one or more parameters include at least one of a device identifier or a user identifier.

20. The system of claim 17, wherein the third-party server is configured to associate the user with the session by determining a probability of the user being associated with the session.

21. The system of claim 17, wherein the metering device is further configured to send a protocol connection offer and to receive acceptance of the protocol connection offer.

22. The system of claim 17, wherein the metering device is in communication with the routing device over a local network.

23. The system of claim 22, wherein the external network is different from the local network.

24. The system of claim 17, wherein the premises is a home or an office.

25. The system of claim 17, wherein the third-party server is further configured to associate, based on the traffic information, a plurality of traffic data associated with the user with the session.

26. The system of claim 17, wherein the control is a privacy control.

27. The system of claim 26, wherein the privacy control includes an identifier of an IP address or an identifier of a user device.

* * * * *